United States Patent
Solberg

(10) Patent No.: US 8,192,107 B2
(45) Date of Patent: Jun. 5, 2012

(54) TELESCOPING MEMBER LOCKING RELEASE DEVICE

(76) Inventor: Glenn S. Solberg, Zahl, ND (US)

( * ) Notice: Subject to any disclaimer, the term of this patent is extended or adjusted under 35 U.S.C. 154(b) by 334 days.

(21) Appl. No.: 12/455,935

(22) Filed: Jun. 9, 2009

(65) Prior Publication Data

US 2010/0040409 A1 Feb. 18, 2010

Related U.S. Application Data

(60) Provisional application No. 61/131,505, filed on Jun. 9, 2008.

(51) Int. Cl.
*F16B 7/14* (2006.01)

(52) U.S. Cl. .......... 403/377; 403/109.2; 403/322.4; 280/482; 280/491.2

(58) Field of Classification Search .... 403/109.1–109.3, 403/109.5, 109.6, 322.4, 324, 325, 378, 379.4, 403/379.5, 322.1, 327; 280/482, 491.2, 491.5, 280/491.4

See application file for complete search history.

(56) References Cited

U.S. PATENT DOCUMENTS

| 651,180 | A | * | 6/1900 | Bush et al. | 403/322.4 |
|---|---|---|---|---|---|
| 943,052 | A | * | 12/1909 | Tunis | 403/322.4 |
| 1,375,775 | A | * | 4/1921 | Burner | 280/478.1 |
| 2,417,646 | A | * | 3/1947 | Hallner | 280/478.1 |
| 3,014,738 | A | * | 12/1961 | Kasten | 280/482 |
| 5,499,886 | A | * | 3/1996 | Short et al. | 403/381 |
| 6,352,278 | B1 | * | 3/2002 | Solberg | 280/482 |
| 6,854,756 | B1 | * | 2/2005 | Solberg | 280/482 |
| 7,097,380 | B2 | * | 8/2006 | Lee | 403/109.2 |

* cited by examiner

*Primary Examiner* — Michael P Ferguson
*Assistant Examiner* — Eric Chau
(74) *Attorney, Agent, or Firm* — Joanne M. Martin

(57) ABSTRACT

A locking and release mechanism device for use with collapsible telescoping members, such as a tow bar that can be collapsed for ease of storage when not in use, and provide for attachment, locking and detachment regardless of load, e.g. to towed and towing vehicle devices regardless of vehicle static load relative to each other. Exemplary In embodiments of the invention include a locking mechanism using roller release members which are lever actuated, the roller release member according to the present invention cooperate with the telescopic members and related elements such that to release the locking mechanism members, a minimum lever force is required.

10 Claims, 5 Drawing Sheets

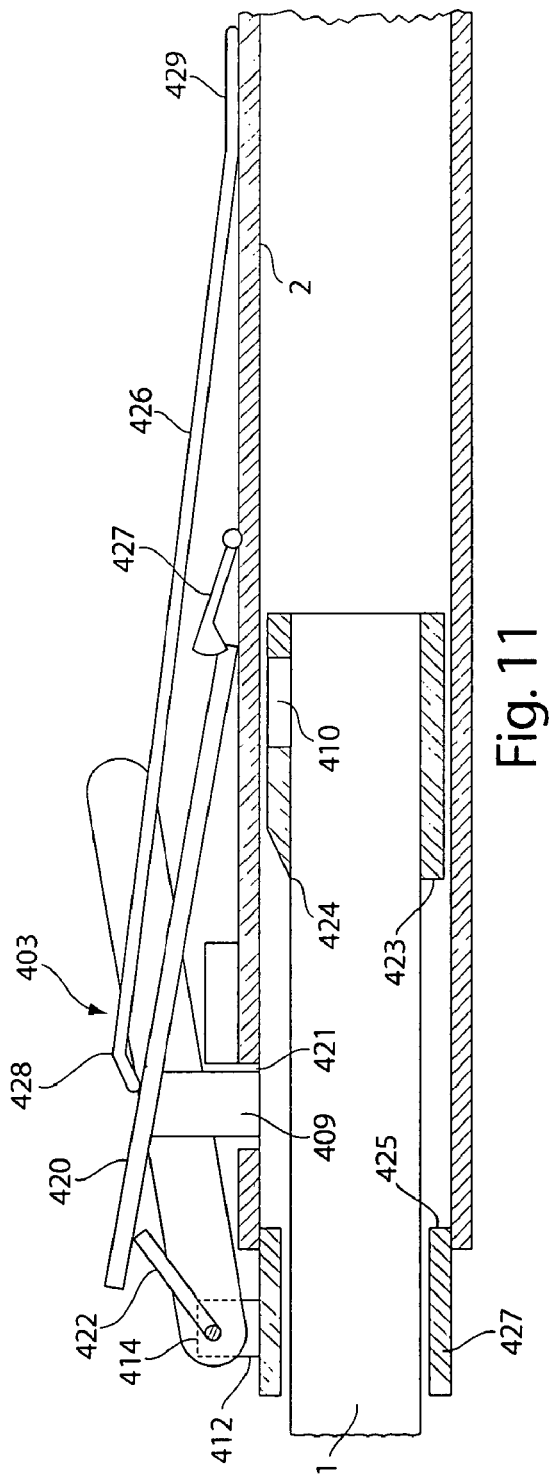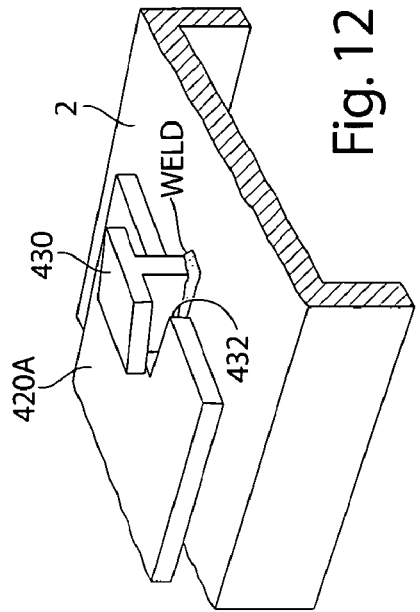

TELESCOPING MEMBER LOCKING RELEASE DEVICE

The present application claims priority on Provisional Patent Application Ser. No. 61/131,505 of the present inventor filed 9 Jun. 2008, and is incorporated herein.

FIELD OF THE INVENTION

The present invention relates to locking elements for telescoping elements, in particular, to the release members associated with the locking elements.

BACKGROUND OF THE INVENTION

Telescoping members such as tow bars are known in the prior art which are arranged to be folded when not in use for storage purposes. Also, known tow bars include telescopically adjustable members which are secured by locking. However, in the prior art structures, there is considerable difficulty in releasing the locking mechanism for the tow bar members especially when the towed and towing vehicles are stopped at a position where there is a tension force on the tow bar members. In such a situation it is necessary to dismount the towing vehicle to manually force disengagement of the locking mechanism by utilizing a hammer or the like.

SUMMARY OF THE INVENTION

The invention relates to a release mechanism and device for collapsible telescoping members, such as a tow bar that can be collapsed for ease of storage when not in use. The invention relates to adjustable telescoping frame members for attachment and detachment regardless to load, e.g. to towed and towing vehicle devices regardless of vehicle static position relative to each other. In exemplary embodiments of the invention wherein the locking mechanism uses roller release members which can be lever actuated, the roller release member according to the present invention cooperate with the telescopic members and related elements such that to release the locking mechanism members, a lever is operated.

BRIEF DESCRIPTION OF THE DRAWING

These and further features of the present invention are better understood by reading the following Detailed Description, taken together with the Drawing, wherein:

FIG. 11 is a cut-away elevation view of a further alternate embodiment according to the present invention; and FIG. 12 is a perspective view of a further alternate embodiment according to the present invention.

DETAILED DESCRIPTION

Figure 1:
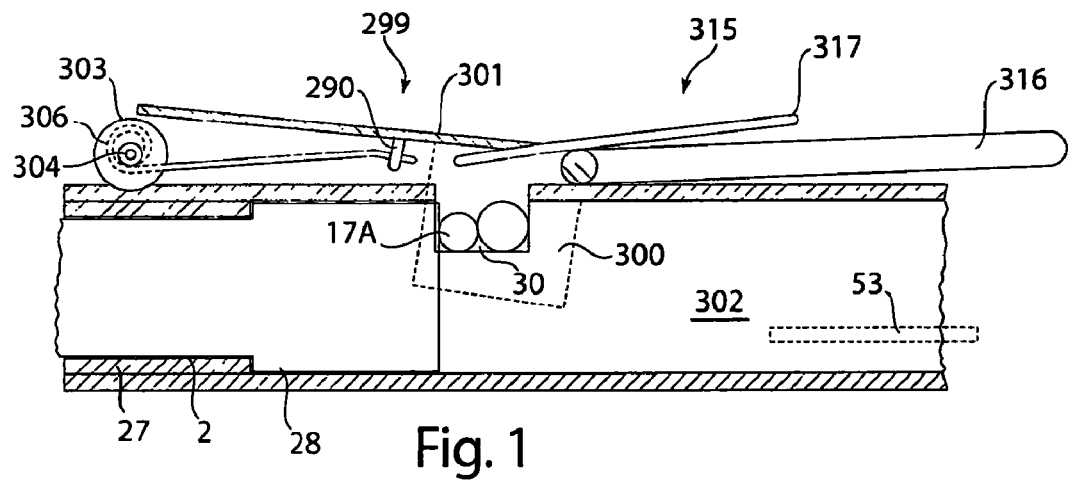
FIG. 1 is cut-away elevation of one embodiment of the present invention.

The embodiments of the present invention include various arrangements telescoping elements that are to be locked into a specific relationship and selectably release therefrom. On example thereof includes a previously filed patent entitled 'Tow Bar Assembly', U.S. Pat. No. 6,352,278 incorporated by reference, which includes a locking member having two parallel rollers disposed between surfaces of the two telescoping members. In the present invention, the roller holder 300 pulled the rollers into the notch by a coil spring 306, which fastened to a wire, shaped in a 'U' to the underside of the roller holder welded to the underside of top 301 of the roller holder, as in FIG. 1. The end of the coiled, wire spring 306 would fit in the 'U' at 290 and pull the two rollers down and in the notch, in FIG. 1.

Figure 2:
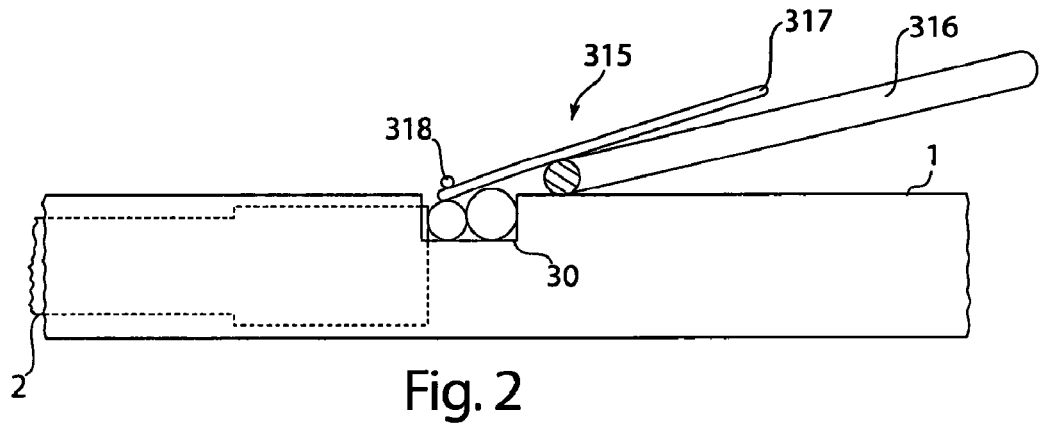
FIG. 2 is an elevation view of simplified embodiment of an alternate embodiment according to the present invention.
Figure 3:
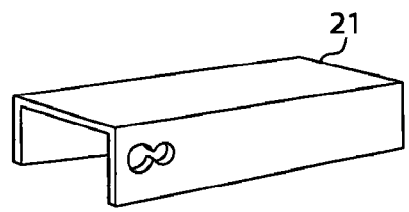
FIG. 3 is a perspective view of the roller holder according to the embodiment of FIG. 2.

FIG. 2 shows an improved pry bar 315. A rod 316 is bent substantially 90 degrees to form a fulcrum generally perpendicular to the tube 1 and having a handle portion of rod 316 that runs generally parallel to the tube 1, and the fulcrum portion is welded to plate 317. The present roller holder 21 is shown in FIG. 3. The pry bar 315 allows room for a spring under the right side (above tube 1).

FIG. 2 shows the new pry bar on an outer square tube 1, with a notch 30 cut in it. An inner tube 2 is against the two rollers 17A, 17B in the notch 30. The two rollers in FIG. 2 are placed in the roller holder 21, which are then placed in the notch, and prevent telescoping of inner tube 1 unless the rollers and the roller holder are pried out with the pry bar 315. If one roller is turned, they both roll out of the notch relieving the forces of tubes 1 and 2 permitting the telescoping assembly to collapse.

Figure 4:
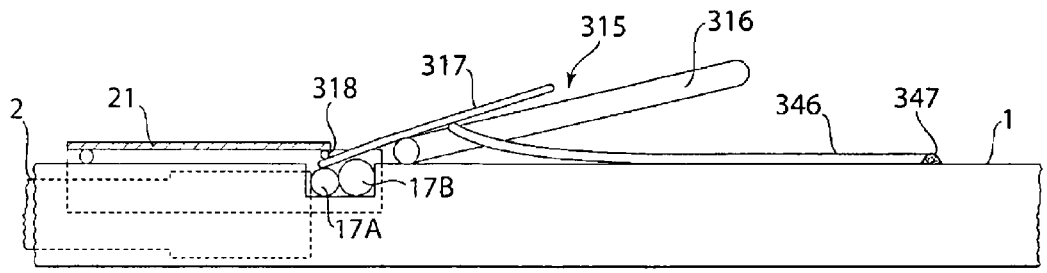
FIG. 4-6 is an elevation view of the embodiment of FIG. 2.

In FIGS. 2 and 4 there is a rod 318 welded to pry bar 315 to take up excess space between the pry bar and the top of the roller holder cover 21.

Figure 5:
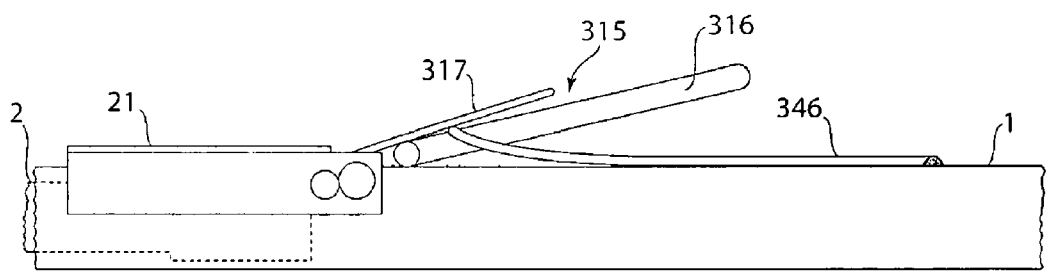

FIG. 5 shows the external view of the roller holder when in the locked position. When the rollers will be pried out of the notch, which is the storage position, the handle 316 and the pry plate 317 will be substantially parallel with outer tube 1, making the latch compact and neat looking.

Figure 6:
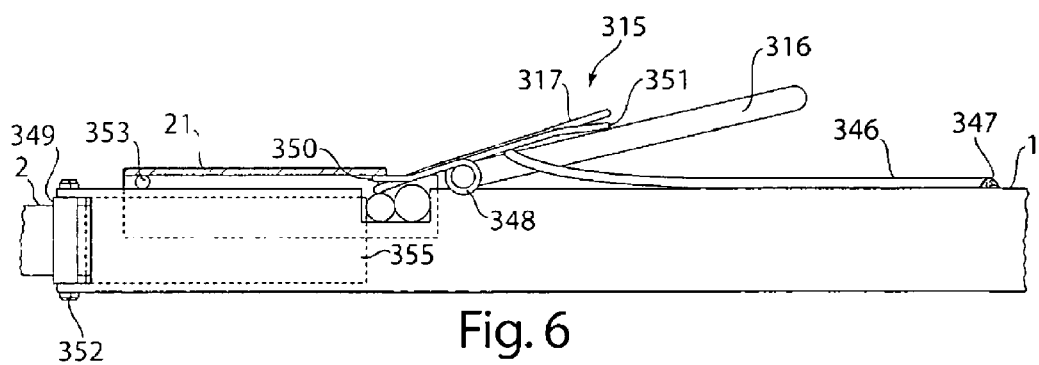

In FIG. 6, the spring 346 pushes the pry bar 315 down and on the rollers and, because of the angle, it keeps tension on the smaller roller 17A so the roller holder 21 doesn't tip or jiggle. The pry bar's tension keeps the back of the roller holder 21 down on stop 353 and thus keeping the rollers in-line between the telescoping elements 1, 2, urging the roller holder counter clockwise. Typically, the roller holder 2 is substantially parallel to the tube 1.

Figure 7:
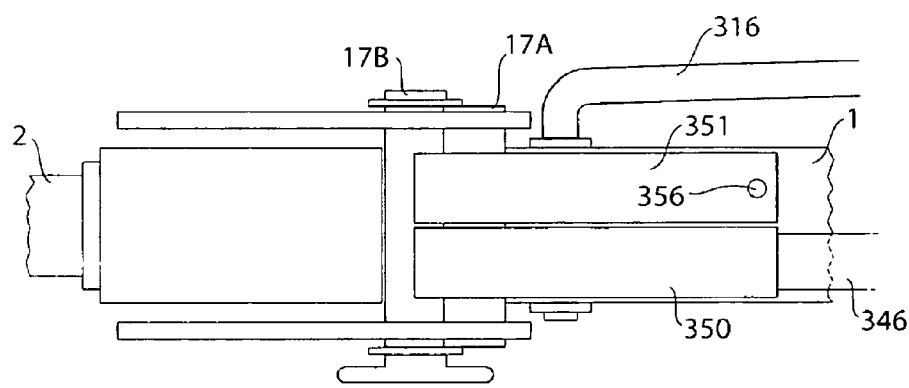
FIG. 7 is a plan view of an alternate embodiment according to the present invention.

Referring to FIGS. 6 and 7, plate 317 can be one plate or it can be two side by side. If it's two side by side, one would likely be wider, assume the wider one 1¼" wide and the other ½" wide. The exemplary wider plate 350 would pry the rollers out of the notch, the exemplary narrower plate 351 is used to adjust the movement of handle rod 316.

In one embodiment, if handle rod 316 extends down to much (substantially parallel to tube 1) or plate 317 turns clockwise to the right to much, the rollers can slip out between the plate 317 and the back of the notch in outer tube 1. To prevent this, the pry plate 351 is bent down at the right so the right side of the pry bar hits outer tube 1 and limits clockwise movement of the pry bar, so the rollers cannot exit the notch, releasing the whole roller holder from the telescoping assembly.

Pry plate 350 can also be bent under the roller holder at 350, to take up excess space between the pry bar and the inside top of the roller holder cover 21.

The dual pry plates side by side make it easier to adjust the movement of rod handle 316 at the right, and also eliminated rod 318 in FIG. 2 that took up the excess space between the pry bar and the top of the roller holder cover 21.

When the smaller pry plate does the adjusting of the movement of rod handle 316, an exemplary embodiment goes along side of the spring 346, not on spring 346, which is an improvement because the adjustment relative to the tube 1 is more precise than stopping the movement by contacting the spring 346 as the spring height (at the contact point) can vary.

Spring 346 in FIG. 6 lifts the right side of the pry plate 317, which drops and urges the left side of the pry plate down on the roller(s) pushing and retaining the rollers in the notch 30.

FIG. 5 provides the spring 346 extending to the right of the pry bar. The roller holder doesn't move the rollers into the notch as the pry plate does that. The leaf spring 346 is much easier to make than a coil spring, and because there is more room, at the right, the spring can be larger and be made of mild steel, and be welded, which makes manufacturing easier.

In FIG. 6 spring 346 is mounted to outer tube 1 with weld 347. Spring 346 can also be two lesser springs, so if one failed the other would hold the rollers in.

In FIG. 6 pry rod 316 goes through a retainer such typically comprising washers 348 in the embodiment of FIG. 6, one on each side of the pry plate(s) to position them. Washers 348 are welded to outer tube 1.

In FIG. 6 a bushing tube 349, that is smaller than outer tube 1, but larger than inner tube 2, is welded to outer tube 1 with weld 352, to hold inner tube 2 and inner tube stub 355 that are welded together, from movement to the left.

Figure 8:
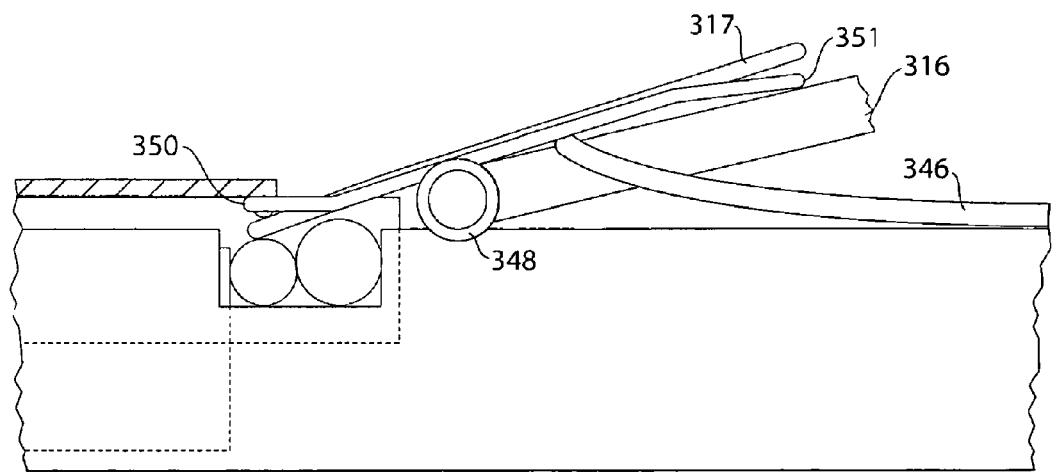
FIG. 8 is an elevation view of the embodiment of FIG. 7.

FIG. 7 is a top view of the FIG. 8 roller holder and FIG. 6. The top of the roller holder has been left off to show the pry plate's relationship to the rollers. Notice pry rod (handle) 316 is off to the side so doesn't touch the top of outer tube 1. The pry plates 350, 351 are shown as the same size, but usually the plate that pries the rollers out would be wider and/or stronger. In this drawing pry plate 351 is the adjusting pry plate and has an allen screw 356 to adjust the movement of pry rod 316, typically extending through the pry plate towards the tube 1. The left side would touch the left roller. The left side of pry plate 350 would pry the rollers out against the roller holder cover that isn't shown. In FIG. 6, the right end of pry plate 351 is bent to adjust the movement of pry rod 316. With the allen screw option in FIG. 7, this bend isn't needed.

In the embodiment shown, the spring 346 is not just a spring, it is a roller lock retaining the rollers and holder together with the telescoping tubes. When the leaf spring is put under the pry plate, it lifts the right end of the pry plate, locking the rollers from coming out of the entire telescoping member latching assembly. The spring 346 locks the rollers and roller holder in the notch by sufficiently tilting the pry plate enough to the left and down, bringing the left side of the pry plate down on the rollers, so the rollers can't get out of the notch unless either the spring is removed or the pry plate is bent. With the embodiment shown, removal of the rollers and holder from the assembly requires only to remove the tack weld on the spring to remove the roller holder. By having more room for the spring 346 as a leaf spring as shown, the leaf spring can be soft mild steel and still be springy enough, and can be fastened by being welded, whereas spring steel can't be welded and still have spring resilience.

In FIG. 8, pry plate 350 would be the widest and strongest to pry the rollers out. It has a sharp bend at the left to take the place of the rod 318 in FIG. 2. Pry plate 351 is straight at the left to touch the smallest roller, but bent at the right at 351 to limit the movement of both pry plates because they would both fasten to pry rod 316. Spring 346 could be under either pry plate, but would likely be under pry plate 350, so the right bend of pry plate 351 (or adjusting screw 356) could rest on outer tube 1.

Figure 9:
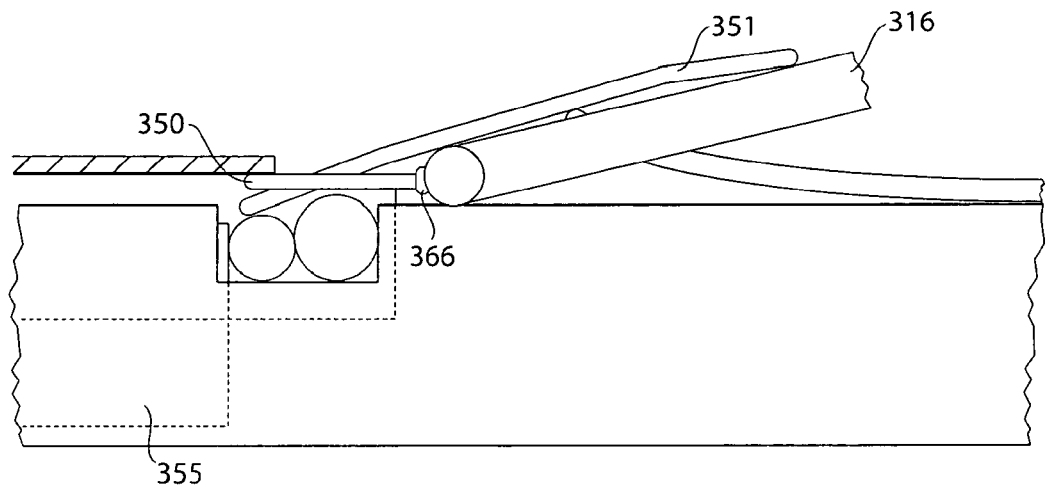
FIG. 9 is an elevation view of a further alternate embodiment according to the present invention.

In FIG. 9, the pry plate that pries the rollers out is welded (366) to the side of pry rod 316 and ends there. The furthest away, adjusting pry plate 351 is also welded to pry rod 316 and is bent at both ends to touch the roller at the left and limit pry plate movement at the right. The spring would have to be positioned under pry plate 351.

Figure 10:
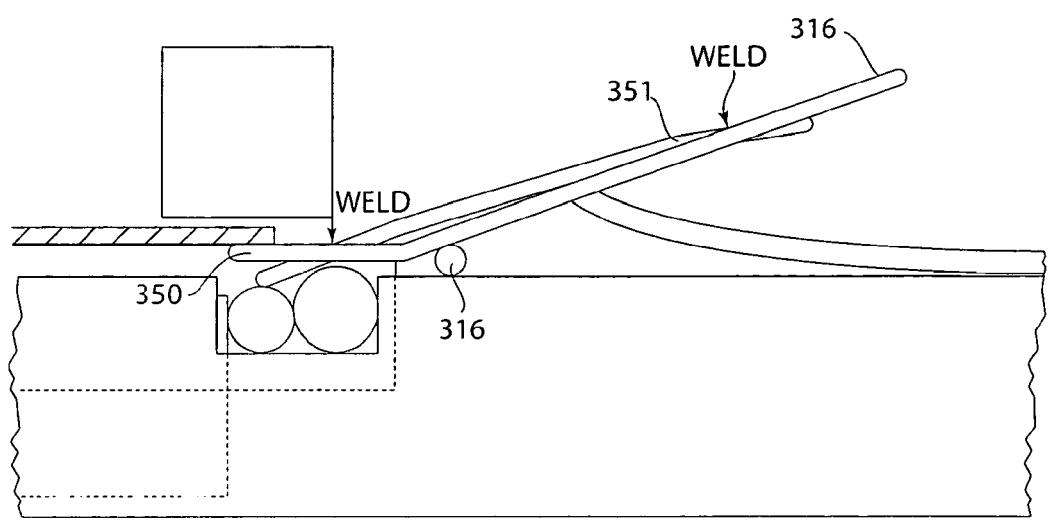
FIG. 10 is an elevation view of a further alternate embodiment according to the present invention.

FIG. 10 shows a pry plate embodiment wherein the pry plate 350 is also the extended handle that pries the rollers out. Pry rod 316 is smaller and has been shortened and is not bent to make a handle. The pry plate 350 is welded to the pry plate 350 and goes through washers not shown that are welded to outer tube 1, to position both pry plates. Pry plate 351 is the adjusting pry plate and does not fasten directly to rod 316, but fastens to the prying pry plate 317. When the pry plate is the handle as in FIG. 10, and is on top of outer tube 1, the handle cannot be parallel with outer tube 1 when the rollers are out of the notch and the tow bar is in the storage position. As seen in FIG. 9 and FIG. 10, the handle of pry plate 350 must be high enough off of tube 1 to lift the rollers off of inner stub tube 355. When stub 355 moves right the rollers fall on inner tube 2, lifting handle 350 up.

An alternative embodiment includes a strip of metal (not shown) from inner stub 355 in FIG. 6 to the left end of the tube, the roller wouldn't fall down on inner tube 2 and the pry plate handle wouldn't lift as high in the storage position, alleviating the need to grind a ramp on the inner stub 355 so the rollers can slide up on it.

Referring to FIG. 11 comprising a combination spring and cover 426 urges pin 409 into hole 410, and covers up the latch assembly. A plate 427 is welded to the outer tow bar member 2, preventing the pin plate 420 from moving upwards (disengaging the pin 409) when pressure is exerted from inner member 1. Exemplary plate 426 is also wider than pin plate 420, and the corners of plate 426 are hammered to curve them down preventing side movement (generally perpendicular to the length if tube 2) of pin plate 420.

As shown in the further embodiment of FIG. 12, the plate 426 could also include a middle of pin plate 420A slotted at the right end, and have a 'T' iron 430 fit in the slot 432 of the plate 420A, and welded to outer member 2 preventing upward and sideways movement of plate 20. Further embodiments include a plate 426 comprising a short square tube bigger than outer member 2.

The spring/cover 426 is bent at point 428 to prevent it from hitting plate 427 when pin 409 drops in hole 410 (locking the members 1, 2). Spring/cover 426 is bent at point 429 to provide spring resilience. The longer plate 426 is typically the softer the metal can be in spring 427. As it is shown, the metal could likely be the least expensive and easiest steel to work with, e.g. mild steel.

Further modifications and substitutions made by one of ordinary skill in the art are within the scope of the present invention which is not to be limited, except by the claims which follow.

What is claimed is:
1. A locking assembly, comprising:
a first telescopic member having an opening, a first end and a second open end;
a second telescopic member having a first end slidable within said open end of said first telescopic member and a distal end; and
a locking means for releasably locking said first and second telescopic members in an extended position, said locking means including
a movable member comprising a plurality of rotatable elements adapted to extend between and contact said first and second telescopic members to maintain said first and second telescopic members in a locked relationship, and a release means mounted on one of said telescopic members to move said movable member out of contact with said first and second telescopic members to permit slidable movement between said first and second telescopic members, wherein said release means includes a holder mounted on said first telescopic member and said plurality of rotatable elements are rotatably mounted on said holder for selected movement into and out of said opening in said first telescopic member to lock and release said first and second telescopic members relative to each other, wherein said rotatable elements extend substantially perpendicular to a longitudinal axis of said first and second telescopic members when in said opening, and wherein said release means is configured such that rotation of said rotatable elements causes said rotatable elements to roll out of said opening and out of engagement with both said first and second telescopic members to release said first and second telescopic members, and a release bar pivotally mounted on said first telescopic member having a first end disposed between said rotatable element and said holder, and directly engaging said rotatable elements operable within a range of motion to urge said rotatable elements into contact with said first and said second telescopic members in said locked relationship, and to urge said holder to remove said rotatable elements from said locked relationship, wherein said release bar includes a spacer disposed between and engaging said release bar first end and said holder to provide a reduced spacing between said holder and said rotatable element when the release bar is inserted therebetween.

2. The locking assembly of claim 1, wherein said release bar comprises a first member disposed substantially parallel to a second member, wherein both said first member and said second member are received between said holder and said rotatable elements.

3. The locking assembly of claim 2, wherein said spacer comprises a bend formed on said release bar first member relative to a corresponding second member disposed to provide a reduced space between said holder and said rotatable elements.

4. The locking assembly of claim 2, wherein said release bar second member comprises a means thereon disposed to engage said first telescopic member and selectively limit said range of motion.

5. The locking assembly of claim 4, wherein said second member means comprises one of a bend of said second member and an adjustment screw movable relatively towards said first telescopic member.

6. The locking assembly of claim 1, wherein said release bar comprises a fulcrum portion and a member extending on either side of said fulcrum portion, wherein a first end of said member extends between said holder and said rotatable elements, said locking assembly further including a spring member disposed on said first telescoping member and contacting a second end of said release bar member and being disposed to urge said rotatable elements into said locked relationship.

7. The locking assembly of claim 6, wherein
said spring member comprises leaf spring element extending along said first telescoping member, and
said release bar member extends outward from said fulcrum portion wherein said end contacts said spring member disposed to prevent removal of said rotatable elements and said housing from said first telescoping member, and upon removal of said spring member from said first telescoping member permit removal of said rotatable elements and said housing from said first telescoping member.

8. The locking assembly of claim 1, wherein said release bar comprises a first member disposed on a fulcrum member, and a second member disposed at an angle relative to said first member to provide a selectively reduced spacing between said holder and said rotatable elements when inserted therebetween.

9. The locking assembly of claim 8, wherein said second member is connected to said first member.

10. The locking assembly of claim 8, wherein said one of said first and said second member forms a release bar lever arm.

* * * * *